United States Patent Office 3,342,051
Patented Sept. 19, 1967

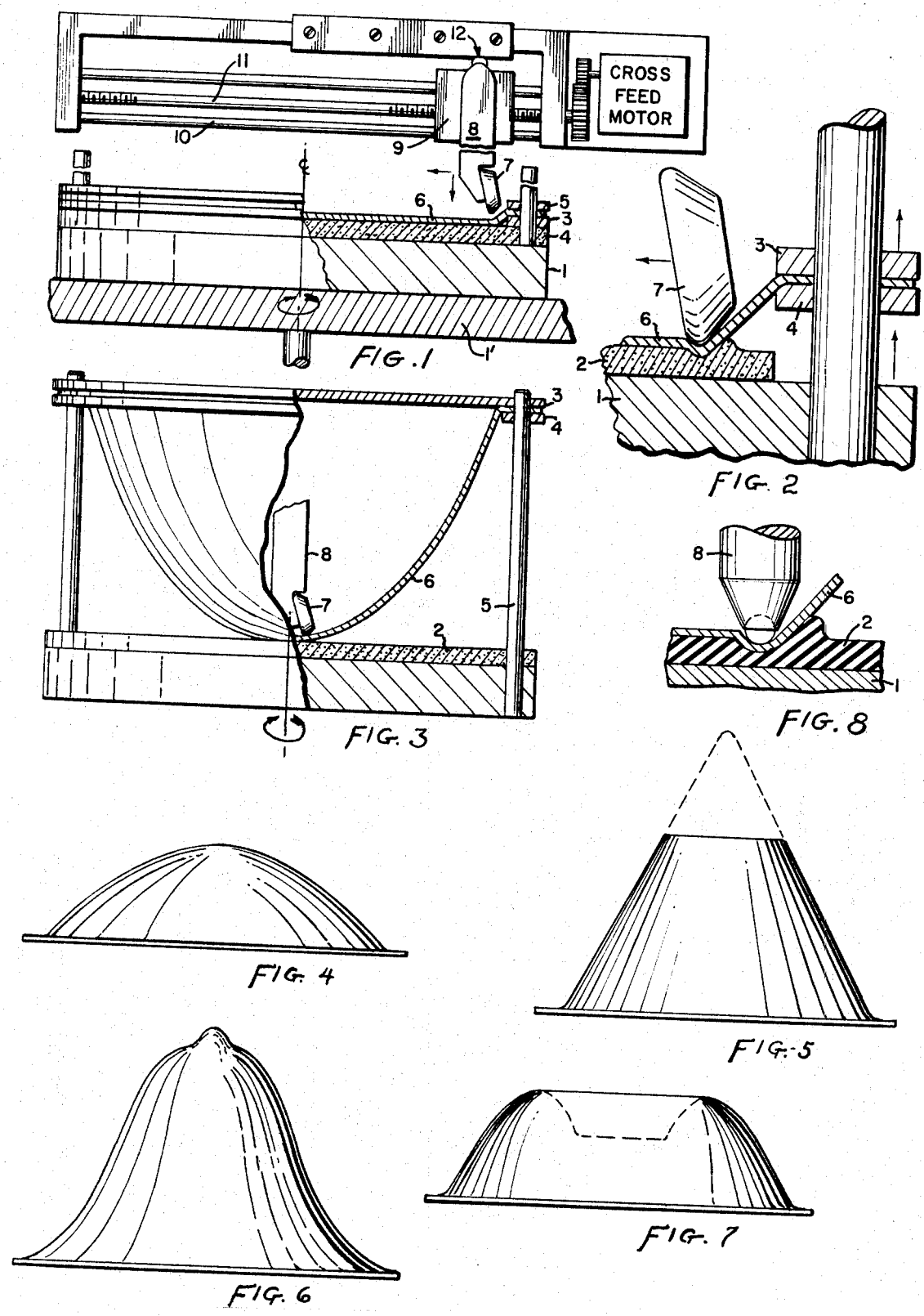

3,342,051
APPARATUS AND PROCESS FOR INCREMENTAL DIELESS FORMING
Edward Leszak, 155 Homestead Ave., Amityville, N.Y. 11701
Filed Aug. 10, 1964, Ser. No. 388,507
10 Claims. (Cl. 72—81)

This invention relates to a method for forming materials into various shapes of revolution without the use of dies, forms, or mandrels.

The object of this invention is to provide new advances in the state of the art metal forming whereby a blank of ductile sheet metal can be plastically worked or deformed into the desired configurations of conic section shapes of revolution utilizing simple inexpensive tooling.

Normally, conic section shapes of revolution have always been one of the more difficult shapes to form by standard methods such as deep drawing, spinning, or hydroforming. For instance, in order to manufacture certain deep parabolic shells, as many as six to eight separate press operations would be required together with separate tooling for each operation. A similar shape made by a spinning process would require a number of breakdown operations utilizing a different mandrel or chuck for each stage. It is possible to produce the same configuration, however, with this invention in one step without the use of any special dies or mandrel. With this process a wide variety of parts can be made on one inexpensive tool and it would be particularly useful where prototype parts or mock-ups are required in a short amount of time. It also can be used to advantage for making performs for secondary or sizing operations.

The invention further relates to arrangements and combination of parts which will be herein described and more particularly set forth in the appended claims.

Reference is to be had to the accompanying drawings in which:

FIGURE 1 is a view in side elevation illustrating the invention, parts being cut away for clarity of the invention. This view also shows the initial stage of the forming process, FIGURE 2 is an enlarged view showing the forming action at the point of contact of the tool and work, FIGURE 3 shows the final stage of the forming process, FIGURE 4 shows a finished shell formed by this process, FIGURES 5, 6, and 7 show other finished shells of different configurations formed by this subject process with the same tooling, and FIGURE 8 shows a modification of the tool shown in FIGURE 2.

The construction of the tooling of this invention is very simple and may be applied within their limits to a number of standard machines usually found in most machine shops.

Briefly, the construction of the preferred embodiment consists of a backing plate 1 which is fastened by suitable means to the machine turntable or face plate 1′. Three or more guide pins 5 are mounted integrally on the backing plate 1. A pair of clamping rings 3 and 4 are mounted so as to slide freely on the guide pins 5. The holes in the clamping rings in which the guide pins 5 are located may have bearing material or ball bearings incorporated therein to minimize friction. The clamping rings 3 and 4 serve to position, to support and to drive the blank material 6 as work is being performed on same. A layer of resilient material 2 is laid on or attached to the backing plate 1. This resilient material may be an elastomer such as polyvinyl chloride plastic, polyurethane plastic, rubber, or some other suitable material. In some instances, a deformable material such as a layer of soft lead would work to advantage. A deforming tool 7 is mounted on a suitable holder 8 which is sufficiently rigid and long enough to contact the face plate within the limits of the guide pins 5. The tool holder 8 is clamped in a standard tool holder block 9 on the carriage 10 of the machine. The forming tool 7 is shown illustrated as a roller. However, other means such as a rotating ball (FIGURE 8) or a solid burnishing tool or a vibrating hammer could be used in some cases to incrementally deform the work piece.

The operational procedure required to fabricate an article in any configuration similar to those shown in FIGURE 4, 5, or 6 are as follows:

A blank 6 of ductile sheet metal is prepared with the proper mounting holes. The blank 6 is fastened between the two clamping rings 3 and 4, and this assembly is slid on the guide pins 5 until it rests against the reaction pad 2.

The deforming tool 7 is brought to bear against the blank with sufficient pressure to plastically deform the material locally, as shown in FIGURE 2. As the turntable 1′ which carries the backing plate 1 revolves, the deforming tool 7 is fed cross-wise, by rotation of feed screw 11, for example, traversing from the outer edge toward the center. This causes the deformed spot to be moved over an infinite number of spots in a continuously decreasing spiral until the entire surface has been worked as required.

As the outer periphery of the material is being formed, it displaces itself outward away from the plate 1 with its clamping rings 3, 4 riding on the guide pins 5, as can be seen in FIGURE 3, until the required depth and form is obtained.

The contours obtainable are dependent upon three basic variables: the rotational speed of the face plate, the cross-feed rate, and the amount of pressure applied to the blank. The pressure must be sufficient to yield the material so as to create a plastic deformation immediately under the tool. Changing any of the three variables will change the final configuration. Holding the rotational speed, cross-feed rate, and pressure constant during the complete operation will generate a straight line element or true cone. FIGURE 5 shows a frustrum of a true cone which has been formed in this manner; the dotted line indicates a true cone generated by continuing the forming action to the apex.

By incrementally changing one of the variable inputs during the course of the operation, it is possible to generate a parabolically-curved unit such as shown in FIGURE 3 or FIGURE 4. By manipulating one or more of the variable inputs, a considerable amount of diverse shapes can be produced, such as, for instance, shown in FIGURE 6. Other modification in shapes may be produced in two or more stages, such as turning a part inside-out (see FIGURE 7). This would be accomplished by first generating a truncated shell part of the way, then inverting the part of the guide pins and finally completing the form with the action on the detail reversed.

There are several ways to incrementally change the feed rate or the pressure variable so as to generate a curved line element surface of revolution.

(1) The pressure supplied to the deforming tool can be minutely changed by controlling with a tracing attachment 12.

(2) An electrical or electronic device regulating the cross-feed control on the machine. Further improvements may be accomplished by having any or all of the variables under the guidance of numerical controls to produce practically any shape within the limits of this process.

Having thus described my invention and advantages thereof, I do not wish to be limited to the details herein disclosed, otherwise than as set forth in the claims; but what I claim is:

1. In a device for forming a workpiece:
    a turntable rotatable about an axis,
    a resilient facing on said turntable,
    clamping means,
    means mounting said clamping means on said turntable for rotation therewith but permitting axial movement of said clamping means with respect to said turntable,
    tool holding means, said tool holding means being movable radially with respect to said axis of rotation in a plane substantially parallel to the surface of said turntable,
    a tool held in said tool holder for applying localized pressure against said turntable facing,
    whereby said work piece when clamped by its periphery to said clamping means and interposed between said tool and said resilient facing is caused to flow under said tool and be locally deformed into said facing so that when the turntable is rotated and the tool is moved radially the piece is formed into a figure of revolution.

2. A device such as that described in claim 1 in which said clamping means includes an annulus, and
    in which said means for mounting said clamping means includes a plurality of shafts extending perpendicularly to said turntable and through a plurality of cooperating holes in said annulus,
    said annulus being slidable along said shafts.

3. A device such as that described in claim 1 in which the tool includes a wheel bearing against said workpiece and having its axis of rotation substantially parallel to a radius of said turntable.

4. A device such as that described in claim 1 in which the tool includes a spherical surface bearing against said workpiece.

5. A device such as that described in claim 2 in which the tool includes a wheel bearing against said workpiece and having its axis of rotation substantially parallel to a radius of said turntable.

6. A device such as that claimed in claim 2 in which the tool includes a spherical surface bearing against said workpiece.

7. A device such as that claimed in claim 1 including means for adjusting the pressure against said resilient facing according to a predetermined function of pressure versus the position of said tool relative to the axis of said turntable.

8. A method of forming a figure of revolution from a blank work sheet including the steps of placing the sheet against a resilient facing pad,
    applying localized pressure against said sheet to locally deform said sheet into said resilient facing,
    advancing the position of localized deformation along a spiral path from the outer periphery of said sheet toward the center,
    whereby the flowing of the sheet during said deformation causes the outer portion of the sheet to lift away from the resilient facing thereby forming a figure of revolution.

9. A method as described in claim 8 in which the pressure, speed of advancement, and spiral path are selected and adjusted so as to produce a desired figure of revolution.

10. In a method for dieless spinning of sheet material, the steps of placing said sheet material on a flat elastic base,
    applying localized pressure to a point on said sheet on the side opposite said base so as to deform said sheet into said base,
    rotating said base and sheet material together,
    moving the point of application of said pressure radially along said base and sheet material,
    whereby the position of incremental flow of said sheet material is advanced spirally over the surface of said sheet material causing the area of said sheet material lying in the direction from which the tool has moved to expand and to lift away from said base to thereby generate a figure of revolution.

References Cited

UNITED STATES PATENTS

| | | | |
|---|---|---|---|
| 1,262,780 | 4/1918 | Griffin | 72—83 |
| 1,930,562 | 10/1933 | Krueger | 72—465 |
| 2,458,381 | 1/1949 | Hughey | 72—465 |
| 3,248,918 | 5/1966 | Brown | 72—81 |

CHARLES W. LANHAM, *Primary Examiner.*

H. D. HOINKES, *Assistant Examiner.*